Patented Sept. 4, 1951

2,566,982

UNITED STATES PATENT OFFICE 2,566,982

PROCESS FOR MANUFACTURING EMBOSSED VINYL RESIN FILM

Harold S. Clemens and Raymond E. Thomas, Newburgh, N. Y., assignors to E. I. du Pont de Nemours & Company, Wilmington, Del., a corporation of Delaware No Drawing. Application August 1, 1946, Serial No. 687,716

3 Claims. (Cl. 18—57)

1

This invention relates to a process for manufacturing plastic sheet material and particularly unsupported plastic sheet material made from synthetic resins.

In the manufacture of upholstery, ladies' pocketbooks, and bookbinding materials it has been customary to coat a textile fabric, both woven and unwoven, as well as paper for certain other uses, with a flexible film forming composition made from cellulose derivatives, and various synthetic resins. The coated fabric and paper products have served their purposes very satisfactorily.

Due to the present textile fabric shortage as a result of the war, the coated fabric products are rapidly disappearing from the market.

A substitute product has been produced from vinyl resins by calendering out at high temperatures an unsupported sheet of polyvinyl chloride resin properly compounded with plasticizers, pigments, etc., without the usual fabric backing. A film properly formulated .010" to .030" thick can be used in many places where coated fabrics have heretofore been used. The equipment required for calendering polyvinyl chloride resin compositions is not simple and represents an investment of several hundred thousand dollars. It is therefore not practical commercially to calender these compositions.

An object of the invention is the preparation of plastic sheet material and more particularly unsupported sheets made from synthetic resins. A further object is the preparation of strong, durable plastic sheet material which can readily be stripped from a coated fabric base. Other objects will be apparent as the description of the invention proceeds.

According to this invention, an unsupported film is produced by a process which utilizes conventional doctor knife coating equipment heretofore used only for the coating of sheet materials. On an equal production basis doctor knife coating equipment represents only a small fraction of the cost of the high temperature calendering equipment. The product made by the new process described hereinafter equals in all respects that made by the conventional high temperature calendering equipment.

The new process comprises spreading a polyvinyl chloride resin plastisol composition, described more fully hereinafter, on a continuous supporting sheet material so treated that the dry resin film can be readily stripped from the support as the final processing step. The support can be re-used several times.

The following specific example is given by the way of illustration and not limitation. A woven cotton fabric running 3.20 yards per pound per 52" width, having a thread count in the warp and filling directions corresponding to 68 x 72 respectively was coated on each side with the following composition:

EXAMPLE I

*Cellulose acetobutyrate composition*

| | Per cent |
|---|---|
| 25% solution of cellulose acetobutyrate in methyl ethyl ketone | 68.9 |
| Pigmented mill base [1] | 14.4 |
| Methyl ethyl ketone | 16.7 |

[1] Pigmented mill base (prepared on 3 roll mill):

| | Per cent |
|---|---|
| Zinc oxide | 60.0 |
| Phthalic diester of monobutyl ether of ethylene glycol | 27.0 |
| Blown castor oil | 3.0 |
| Butanol | 10.0 |

Approximately 1.0 ounce of non-volatile components were applied per square yard on one side of the fabric in two doctor knife applications and approximately ½ ounce of non-volatile components were applied on the opposite side of the fabric in one doctor knife application by means of an apparatus described by W. T. Anderson in U. S. Patent 2,106,276, issued February 8, 1938. The volatile component was evaporated after each successive coat by passing the coated fabric through a two section drying chamber as disclosed by W. T. Anderson et al. in U. S. Patent 2,107,275 issued February 8, 1938.

The coated fabric as described above is the carrier or support on which the unsupported polyvinyl chloride resin film is prepared and finally separated. The coated fabric may be re-used many times for preparing the unsupported polyvinyl chloride resin film.

The polyvinyl chloride resin plastisol composition may be prepared in a manner described by N. Armstrong in a copending application S. N. 651,389, filed March 1, 1946, now U. S. Patent No. 2,507,688. A typical formulation is as follows:

*Polyvinyl chloride resin plastisol composition*

| | Per cent |
|---|---|
| Powdered polyvinyl chloride resin | 46.34 |
| Phthalic diester of monobutyl ether of ethylene glycol | 22.38 |
| Bone black pigment | 5.07 |
| Barytes filler | 7.20 |
| Blown castor oil | 0.77 |
| Soya lecithin | 0.93 |
| Solvent naphtha | 11.58 |
| Ethyl alcohol | 5.73 |
| | 100.00 |

The above composition is prepared by first grinding the pigments and the plasticizer (phthalic diester of monobutyl ether of ethylene glycol) over a 3 roll paint mill in a conventional manner. To the pigment-plasticizer dispersion is added all the remaining components except one half of the diluents (solvent naphtha and ethyl alcohol). The mixture is then thoroughly mixed on a paddle stirrer until the resin is wetted down sufficiently to form a free flowing mass. The composition is then passed over a 3 roll paint mill having differential speeds of 33⅓, 100 and 300 R. P. M. After the material is passed over the 3 roll mill, the remaining half of the diluents is stirred in the mass. The composition had an initial viscosity of 15–20 seconds as measured by a Stormer viscosimeter employing 100 revolutions with a 1000 g. weight. The Stormer viscosimeter is described in Ind. & Eng. Chem., 34, ppg. 163, Feb. (1942).

In order to prepare smooth, free flowing compositions, the resin and pigments must be reduced in particle size to not over 5 microns in diameter and preferably not over 1.5 microns in diameter.

The vinyl resin plastisol composition must have sufficient anchorage or bond to the carrier sheet that it will not become detached during processing and insufficient anchorage or bond to permit it to be stripped or detached from the carrier sheet as a final manufacturing operation without distorting or damaging the unsupported film. The volatile liquids or diluents in the plastisol composition accomplish the critical degree of adhesion or bond to the carrier sheet.

The polyvinyl chloride resin plastisol composition prepared as described above is coated on the previously described cellulose acetobutyrate coated fabric carrier in a plurality of coats, employing the same type of apparatus referred to above for the coating of the carrier.

After each successive coat the material is passed through the two section drier described by Anderson et al. in U. S. Patent 2,107,275, in which the air temperature in the first section is 200° F. and in the second section is 270 to 290° F. which causes sufficient coalescence of resin, pigment and plasticizer particles to form a smooth dry film capable of bending around a ⅛" rod without cracking. The polyvinyl chloride resin film adhered to the cellulose acetobutyrate coated fabric sufficiently that it could be handled on textile winding equipment and rolls of 4" diameter without the film becoming separated from the coated fabric. After the polyvinyl chloride resin film has been built up to the desired thickness on the coated fabric carrier, about 6 to 8 coats required for .018" to .025", the entire assembly is then passed through a radiant heat zone in such a manner that the heat strikes the polyvinyl chloride resin film and raises the temperature of the film up to 300–350° F., at which temperature the resin, pigments, and plasticizers all fuse or coalesce to form a continuous film. Any heating of the polyvinyl chloride resin film after it reaches the optimum fusing temperature is to be avoided since prolonged heating will volatilize the plasticizer and tend to weaken the fabric carrier. The film is then cooled to room temperature, whereby a dry tough, flexible film is obtained. The film may be stripped from the carrier at this stage and used where coated fabrics have served in the past.

However, before stripping the film from the carrier, it is usually decorated by embossing a design on its surface by pressing between a heated platen and a felt bed, the platen having a design engraved on the side contacting the film. Also, the design may be impressed upon the surface by passing between heated pressure rolls, one of which has an engraved design on the surface contacting the film.

After embossing the film may be given a final surface coat to adjust the lustre of the surface.

*Finishing composition*

| | Per cent |
|---|---|
| 10.7% solution of polyvinyl chloride resin in methyl ethyl ketone | 82.20 |
| Bone black pigment | 7.28 |
| Phthalic diester of monobutyl ether of ethylene glycol | 9.20 |
| Blown castor oil | 1.32 |

The above composition is prepared by grinding the pigment in the plasticizers in a conventional manner. The resin is dissolved in the methyl ethyl ketone at approximately 170° F. The pigment-plasticizer mixture is thoroughly mixed with the resin solution and applied at a temperature not lower than 100° F. Since at normal room temperature this composition will form a gel. The finishing composiiton may be applied by the apparatus as described by R. Boice in U. S. Patent 2,196,894, issued April 9, 1940, and the volatile solvent removed by passing through a heated chamber.

After the final finishing coat is applied and dried, the polyvinyl chloride resin film is stripped from the cellulose acetobutyrate coated fabric without disturbing the cellulose acetobutyrate coating on the fabric. The coated fabric carrier may be re-used several times. An unsupported film produced as described above had the following properties:

| | |
|---|---|
| Weight/sq. yard ozs. | 23.0 |
| Thickness inch | .024 |
| Tensile strength: | |
| (Grab method) lbs./in. lbs. length | 123 |
| (Grab method) lbs./in. lbs. width | 139 |
| Tear strength (tongue method) lbs. length | 6.2 |
| Tear strength (tongue method) lbs. width | 6.2 |

The unsupported film was fabricated into ladies' pocketbooks, bicycle seat covers, theater seat covers, and chair upholstery. The material was tough and flexible and useful in many other applications where coated fabric has been used in the past.

In the place of the cellulose acetobutyrate coated fabric carrier, other cellulose derivative coatings which will not form a firm bond with the polyvinyl chloride resin film may be used such as, e. g., cellulose acetopropionate, cellulose acetate, ethyl cellulose and methyl cellulose. Cellulose nitrate coatings will provide a surface to which the polyvinyl chloride film will not firmly anchor, but it is not preferred since it will decompose at the temperature required for complete fusing or coalescing of the polyvinyl chloride resin film. Other types of coatings for the carrier fabric such as polythene, polyvinyl butyral, cured phenolic resins, cured melamine resins, cured U–F resins may be used. Any type fabric woven or non-woven may be used as the carrier for the unsupported film. Any type of film former may be used for the carrier fabric which does not form a firm bond with the polyvinyl chloride resin film and which will not decompose or ignite at the temperature required for complete fusing or coalescing the polyvinyl chloride resin film.

The following examples illustrate the use of ethyl cellulose and cellulose acetopropionate in place of cellulose acetobutyrate, although it will be apparent to those skilled in the art that the other resinous materials mentioned above may be substituted in about the same proportions for the cellulose derivatives given in the examples.

EXAMPLE II

The following composition may be used to impregnate a fabric base in substantially the same manner as set forth in Example I:

| | Per cent |
|---|---|
| Ethyl cellulose | 17.3 |
| Dibutyl phthalate | 5.2 |
| 5% leaded zinc oxide | 10.4 |
| Ethyl acetate | 40.3 |
| Toluol | 26.8 |

Approximately 1 oz. of non-volatile components of the above are applied per square yard on one side of the fabric in two doctor knife applications. The opposite side is then coated with about ½ oz. of non-volatile components per square yard and the fabric is thereafter dried and used to prepare the unsupported polyvinyl chloride resin film as set forth in Example I.

EXAMPLE III

Another composition which has given satisfactory results for impregnating the fabric base from which the polyvinyl chloride resin is ultimately stripped has the following composition:

| | Per cent |
|---|---|
| Cellulose acetopropionate | 13.3 |
| Dibutyl phthalate | 11.0 |
| Zinc oxide | 21.7 |
| Ethyl acetate | 27.0 |
| Ethyl alcohol | 27.0 |

The base fabric is coated in the same manner as given in the previous examples. The addition of aluminum flake pigment to the above impregnants increase the life of the base fabrics by preventing scorching at the edges where there is little or no plastisol coating during the gelatinization step.

It has been found that almost any synthetic resinous material may be used to coat the fabric from which the polyvinyl chloride resin film is ultimately stripped, provided the anchorage between the impregnated carrier fabric and the polyvinyl chloride resin film is within certain limits. If the adhesion is insufficient it will become detached when passing around relatively small rollers as it goes through the coating and drying apparatus. On the other hand, if the degree of anchorage is too great, the film will be distorted when separated from the carrier in the final manufacturing step. The preferred range of adhesion of the fused film to the impregnated carrier is from about 0.2 lb. to 1.0 lb. as determined on a Scott tester machine. This test is carried out by determining the degree of pull necessary to strip a 2 in. wide sample of polyvinyl resin film from the carrier fabric at a rate of 12 in. per minute. The adhesion may be as great as 3 lbs. per 2 in. strip if the polyvinyl resin film is of such composition that it will not be distorted when pulled away. An anchorage less than .1 lb. per 2 in. strip is not satisfactory in the machinery used at the present time for the reasons given above.

In the examples it has been found that the cellulose acetobutyrate coated base fabric gives an adhesion value when determined as outlined above from .2 to .8 lb. The corresponding values for ethyl cellulose and cellulose acetopropionate is .3 to .5 lb. respectively on a 2 in. sample.

The formulation of the vinyl resin plastisol composition may vary over wide limits with respect to ratio of resin to plasticizer and degree of pigmentation. The plastisol compositions are particularly adapted to the process of this invention since they do not contain solvents which tend to dissolve the coatings on the carrier. Also, the high solids content (80-90%) permits the building up of a thick film .020" to .023" in 6 to 8 coats where 20 to 30 coats would be required if solutions of the resin were employed.

In the preferred embodiment of the invention polyvinyl chloride resin is employed. Other synthetic resin powders of proper particle size capable of dispersing in plasticizers which have substantially no solvent action on the resin at room temperature, with or without diluents which are compatible with the plasticizer but having no solvent action on the resin may be used in practicing this invention. Resins other than polyvinyl chloride which may be used in practicing this invention include copolymers of vinyl chloride obtained by polymerizing vinyl chloride in the presence of other monomers copolymerizable therewith, such as the diesters of fumaric or maleic acid including dimethyl, diethyl, dipropyl, and dibutyl fumarate and maleate, copolymers of vinyl chloride and esters of acrylic and alpha-chloroacrylic acid or methacrylic esters such as the methyl, ethyl or propyl esters, copolymers of vinyl chloride with vinylidene chloride and also copolymers of vinyl chloride and vinyl esters of lower fatty acids such as vinyl acetate. The vinyl chloride copolymers and polymers can be prepared by polymerizing the monomer or monomer mixtures in aqueous emulsion as is well known in the art. When copolymers are used, polyvinyl chloride is present in major amount—usually about 95% polyvinyl chloride and 5% of the other component. To obtain the polymer in suitable form for use in preparing the plastisol compositions the polymers may be isolated from the aqueous dispersion by coagulation according to conventional methods such as by the addition of a salt solution, filtered and dried or by spray-drying the resin dispersion.

By the term "plastisol dispersion" as used in the appended claims is meant a dispersion or suspension comprising undissolved resin suspended in a plasticizer for the resin which will dissolve the resin only at temperatures considerably above room temperature.

It is apparent that many widely different embodiments of this invention may be made without departing from the spirit and scope thereof, and therefore, it is not intended to be limited except as indicated in the appended claims.

We claim:

1. The process of manufacturing unsupported vinyl resin films which comprises the steps of (1) spreading a plastisol dispersion comprising a polyvinyl chloride resin and plasticizer on a fabric carrier which has been impregnated with cellulose acetobutyrate, said polyvinyl chloride resin containing from 95 to 100% polyvinyl chloride, (2) subjecting the said dispersion to heat while mounted on the said carrier until the resin is gelatinized and a tough, durable film is produced, (3) embossing the said film while secured to the carrier allowing it to cool, and subsequently (4) separating it from the said carrier, the adhesion between the gelatinized film and the carrier being of the order of 0.1 pound to 3.0 pounds per 2 inch width when stripped at the rate of 12 inches per minute.

2. The process of claim 1 in which the polyvinyl chloride resin is a homopolymer.

3. The process of claim 1 in which the plasticizer is the phthalic diester of the monobutyl ether of ethylene glycol.

HAROLD S. CLEMENS.
RAYMOND E. THOMAS.

REFERENCES CITED

The following references are of record in the file of this patent:

UNITED STATES PATENTS

| Number | Name | Date |
| --- | --- | --- |
| 1,876,432 | Phillips | Sept. 6, 1932 |
| 2,028,936 | Kratz et al. | Jan. 28, 1936 |
| 2,188,396 | Semon | Jan. 30, 1940 |
| 2,486,258 | Chavannes | Oct. 25, 1949 |

FOREIGN PATENTS

| Number | Country | Date |
| --- | --- | --- |
| 500,298 | Great Britain | Feb. 7, 1939 |

Certificate of Correction

Patent No. 2,566,982 September 4, 1951

HAROLD S. CLEMENS ET AL.

It is hereby certified that error appears in the printed specification of the above numbered patent requiring correction as follows:

Column 4, line 4, after the words and period "the surface." insert the sentence *A typical finishing composition is as follows:*; line 20, for "Since" read *since*:

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*